May 21, 1957  W. J. HARDGROVE, JR  2,792,593
MEANS FOR FABRICATING HOLLOW ARTICLES FROM ORGANIC
PLASTIC MATERIALS
Filed Dec. 24, 1953  2 Sheets-Sheet 1
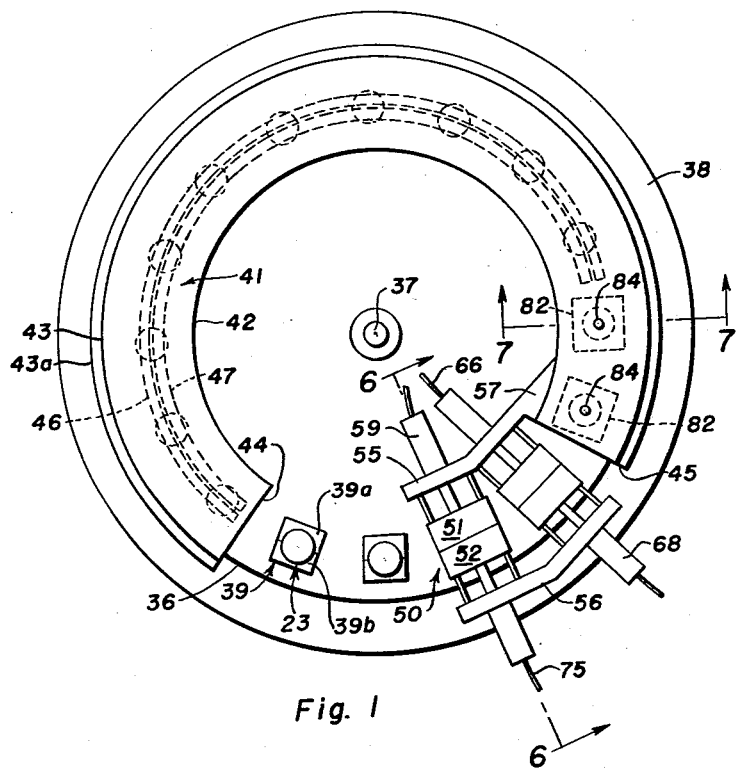
Fig. 1
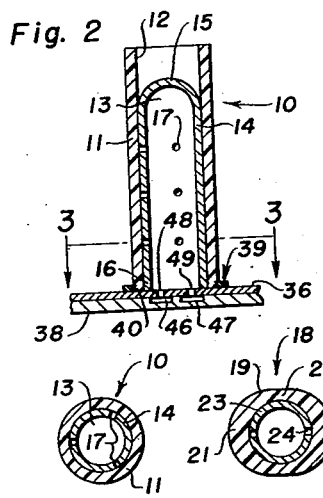
Fig. 2
Fig. 4
Fig. 5
Fig. 3  Fig. 3A  Fig. 3B
Wallace J. Hardgrove, Jr.
INVENTOR.
BY Charles S. Wilson
ATTORNEY.

May 21, 1957  W. J. HARDGROVE, JR  2,792,593
MEANS FOR FABRICATING HOLLOW ARTICLES FROM ORGANIC
PLASTIC MATERIALS

Filed Dec. 24, 1953  2 Sheets-Sheet 2

Wallace J. Hardgrove, Jr.
INVENTOR.

BY Charles S. Wilson
ATTORNEY.

United States Patent Office 2,792,593
Patented May 21, 1957

2,792,593
MEANS FOR FABRICATING HOLLOW ARTICLES FROM ORGANIC PLASTIC MATERIALS

Wallace J. Hardgrove, Jr., Freeport, N. Y.

Application December 24, 1953, Serial No. 400,289

4 Claims. (Cl. 18—19)

The invention relates in general to the fabrication of hollow articles e. g. containers and more particularly has to do with a means for fabricating such hollow articles from organic plastic materials of the type which become moldable at elevated temperatures.

Heretofore, known processes and apparatus used in fabricating hollow articles of the above type include, more or less, the steps of suitably forming a hollow blank or preform of the material at a temperature where it is readily moldable, inserting the preform into a mold while it is still hot and formable and forcing a pressurized fluid, such as air, into the interior of the preform to expand or blow it into forming contact with the walls of the mold where it cools and sets. In these prior known processes, the wall of the preform is of uniform thickness and the pressurized fluid is the sole means utilized in forcing the preform into forming contact with the wall of the mold.

Articles produced by these prior known methods are generally unsatisfactory. For example, where the finished article is substantially oval or square in cross-section, the walls thereof are not uniform in thickness with the result that they fracture or fail during normal use. Further, in instances where the finished article is a squeeze type bottle, the non-uniformity in the thickness of its walls results in the slow recovery of the bottle to its normal shape or contour after the release of a deforming pressure. Moreover, these bottles are also unsatisfactory in that the opening through the neck thereof is usually off-center and its interior wall surface uneven or rough so that additional finishing operations are required to prepare the neck to snugly receive the insert or plug in which the orifice is formed.

Another objectionable feature of prior known processes and apparatus is that during the time the pressurized fluid is expanding the heated preform into forming contact with the mold, the fluid itself becomes heated. As a result, the mold must be held closed for a considerable period of time to permit the article to cool and set before it can be removed from the mold.

The present invention contemplates a means for fabricating hollow articles from organic plastic materials whereby the time during which the article must remain within the mold to cool and set is reduced and whereby the walls of the finished articles are of uniform thickness, or are of a preselected or predetermined thickness through any particular portion thereof, irrespective of the shape or contour of the article. Thus, in the event the article is a flask or bottle, the neck thereof is accurately centered and the interior surface of its wall is relatively smooth and finished.

Moreover, the present apparatus makes it possible to produce a substantially finished article free of excessive flash or externally projecting surplus material, which must be removed, thereby reducing finishing operations to a minimum.

Further, the instant invention contemplates supporting a preform of organic plastic material on a mandrel, the outer diameter of which determines the inner diameter of the neck of the hollow article or bottle to be fabricated from the preform, to thereby permit the heating of the preform to relatively high temperatures and assuring the accurate formation of the neck of the article.

To reinforce the article or to produce a decorative effect thereon the present invention also contemplates a method of and means for integrally incorporating with the walls of the article one or more bands of material similar to or contrasting with the material of the article.

With the above and other objects and advantages in view, as will be apparent, this invention consists in the steps and in the construction, combination and arrangement of parts all as hereinafter more fully described and illustrated in the accompanying drawings, wherein:

Fig. 1 is a plan view of apparatus specially designed to carry out the present method;

Fig. 2 is a longitudinal section through a mandrel and a preform positioned thereon;

Fig. 3 is a cross-section taken along line 3—3 of Fig. 2 and shows, in particular, the ports in the mandrel which direct the pressurized fluid against selected portions of the preform;

Figs. 3A and 3B are sections similar to Fig. 3 but show other forms of the preforms contemplated herein and the positioning of the ports in the mandrel with respect to the walls of these preforms;

Fig. 4 is a section similar to Fig. 2 but showing a longitudinal section through a mandrel and a preform having a reinforcing or decorative band positioned thereon to be integrally associated with the outer face of the wall during the molding operation;

Fig. 5 is a cross-section taken along lines 5—5 of Fig. 4;

Figure 6:
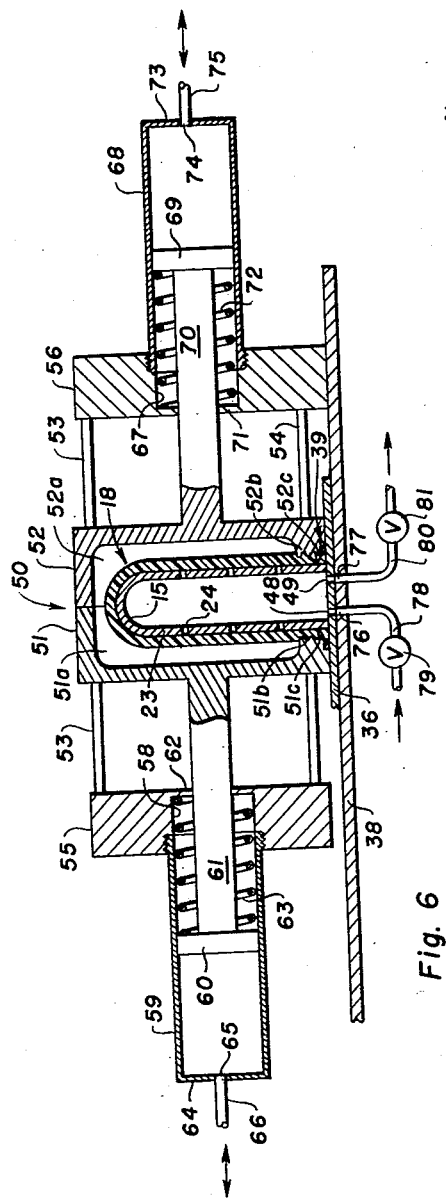
Fig. 6 is a section taken along line 6—6 of Fig. 1 showing the means for circulating the pressurized forming fluid and the coacting mold in its closed position.

In general, the present invention contemplates extruding, molding or otherwise suitably forming the plastic material into a hollow blank or preform having walls of predetermined thickness relative to an axial opening i. e. a centrally disposed longitudinal opening, which may extend either entirely through the preform or terminate short of one end to form an end wall therefor. The diameter of the axial opening is determined by the desired cross-section of the neck of the article and the wall thickness of the preform is determined by the cross-section of the ultimate shape of the body of the article. Thus, for example, for an article having a body substantially oval in cross-section, the preform is substantially oval in cross-section having the wall portions at the opposite ends of the major axis substantially thicker than the wall portions at the opposite ends of the minor axis.

To fabricate the preform into the ultimate article, it is positioned on a hollow mandrel or support that substantially fills the axial opening thereof where it is heated to the temperature at which the material of the preform can be molded or formed. At this point, if the axial opening extends through the preform, a suitable crimping or capping mechanism closes the open end of the preform over the associated end of the mandrel. The heated preform is then placed between the halves of a suitable cooled mold and the mold is closed. The mold and mandrel are designed to the end that selected parts thereof cooperate to form the neck portion of the article.

After the mold is closed, the preform is allowed to partially cool and set and is then expanded or blown into forming contact with the relatively cold walls of the mold by a suitable pressurized fluid, such as air, that is introduced through suitable inlet port means into the interior of the mandrel and is directed under pressure against the thicker portions of the wall of the preform by ports properly located in the mandrel wall. Thus, the initial forming pressure is directed against the thicker wall portions of the preform so that as the preform expands toward the walls of the mold the material thereof is first drawn from the thicker wall portions thereby assuring a desired wall thickness in the ultimate article.

Upon contact with the relatively cold walls of the mold, the walls of the article are cooled and begin to set, to increase the rate of cooling of the article and thereby reduce the time it must remain in the mold, exhaust port means are also provided that permit the pressurized fluid to bleed off or exhaust during the forming operation. Thus, the pressurized forming fluid is circulated through the interior of the mandrel and article where it serves as a heat transfer medium to withdraw heat from the article and thereby reduce the time required for the article to set within the mold. The mold halves are then separated and the finished article is removed therefrom.

In the event it is desired to have one or more reinforcing or decorative bands formed integrally with the walls of the article, a band of the same or different thermoplastic material than that from which the article is formed is suitably molded, extruded or otherwise formed and is dimensioned to be slipped over or engage the outer surface of the preform where it will ultimately follow the contour imparted to the preform during the molding operation. One or more of these bands are positioned on the exterior of the preform prior to the heating thereof and during the forming operation, the band or bands are simultaneously formed with the article and are integrally united therewith.

Referring now to the drawings and more particularly to Figs. 2 through 5, the preforms contemplated herein are formed by any suitable means such as by extruding or molding and are dimensioned as to length and cross-section as dictated by the ultimate or end shape of the article to be formed therefrom. For example, to form a bottle or flask having a body portion that is substantially cylindrical in cross-section and having a cylindrical neck extending from one end thereof, a preform 10 such as shown in Figs. 2 and 3 is required. More particularly, preform 10 comprises a cylindrical body 11 of suitable organic thermo-plastic material having a centrally disposed axial opening 12 extending completely therethrough. Since both the body 11 and axial opening 12 are both circular in cross-section and concentrically disposed with respect to each other, the wall of body 11 defined thereby is uniform in thickness. Opening 12 ultimately forms the passageway through the neck of the bottle and is dimensioned accordingly.

The mandrel 13 to be used with preform 10 includes a hollow cylindrical member 14 having an outside diameter slightly smaller than the axial opening 12 in the preform to the end that the preform may be slip-fitted over the mandrel. Member 14 is closed at one end thereof by an end wall 15, while the opposite or base end 16 thereof is open. At spaced intervals the member 14 is pierced by a plurality of pressure ports 17 which may be arranged in any pattern as required by the shape and contour of the final product. As shown in Figs. 2 and 3, three transverse rows of pressure ports are provided in the member 14 and each row includes three individual ports 17 spaced equi-distantly or 120° from each other. It is to be understood that in this adaptation any number of rows of pressure ports may be provided and that each row may include any number of ports.

To form a flask or bottle having a body that is substantially or partially oval in cross-section a preform 18 such as shown in Fig. 3A is required. As in the instance of preform 10, preform 18 comprises an elongated body 19 of suitable organic thermo-plastic material having a circular axial opening 20 extending therethrough. Body 19 is substantially oval in cross-section and the axial opening 20 extending therethrough is circular in cross-section. Therefore, the wall of body 19 defined thereby is of non-uniform thickness having thickened portions 21 disposed at the opposite ends of a major axis of the cross-section of the body and relatively thin portions 22 disposed at the opposite ends of its minor axis. The mandrel 23 used with preform 18 is generally similar to mandrel 13 except that there are only two pressure ports 24 in each transverse row and these are disposed at opposite ends of a diameter of the mandrel i. e. 180° apart. For purposes that will hereinafter be more fully set forth, when preform 18 is positioned on mandrel 23 the thickened portions 21 of its wall are disposed in alignment with the pressure ports 24 as shown in Fig. 3A.

In the fabrication of flasks or bottles having bodies substantially square or rectangular in cross-section, a preform 25 such as shown in Fig. 3B is used. In general, the preform 25 is similar to preforms 10 and 18 except that its body 26 is square or rectangular in cross-section. Therefore, the circular axial opening 27 extending through body 26 defines a wall of non-uniform thickness in that it is thicker at the corners 28 than at the sides 29 between the corners. The mandrel 30 used with preform 26 is similar to mandrels 13 and 23 save that each row of its pressure ports 31 includes four ports equally spaced about the mandrel or 90° disposed from each other. When preform 25 is mounted on mandrel 30 it is positioned to have its thickened corner portions 28 disposed opposite or in alignment with the pressure ports 31.

To reinforce the wall of the article formed from either preforms 10, 18, or 25 or to produce a decorative effect thereon, a band of organic thermo-plastic material is extruded, molded or otherwise suitably formed and dimensioned so that it can be slip-fitted over the article while on the mandrel so that it is disposed over the exterior surface of the preform with which it is to be used. Thus, to provide a decorative band on the exterior surface of a bottle or flask, a band of similar thermo-plastic material but different in color is fabricated and disposed adjacent the exterior surface of the preform prior to its being pressed against the inner surface of the mold.

As shown in Figs. 4 and 5 a preform 18 has been provided with a decorative or reenforcement band 32. Since preform 18 is oval in cross-section with thickened wall portions disposed at the opposite ends of its major axis, the band 32 is preferably oval in cross-section with thickened wall portions 33 disposed at the opposite end of its major axis and relatively thin wall portions 34 disposed on the opposite ends of its minor axis. Thus the band 32 not only initially corresponds to the cross-section of the preform 18 but also agrees with the final cross-section of the finished product.

It is to be understood that the axial openings in the preforms of various sizes and shapes need not extend completely through the body of the preform but may terminate short of one end thereof to form an end wall 35 such as shown in conjunction with the preform 18 illustrated in Fig. 4.

Referring now to Fig. 1, which shows one form of an apparatus for fabricating bottles, flasks or hollow articles from preforms such as heretofore described, 36 designates a flat, circular carriage that is supported in a horizontal position by means of a central post or spindle 37 for rotation upon a circular base or bed 38. A plurality of mandrels, such as for example mandrels 23, shown in Figs. 4 and 5, are each mounted at its base or open end 16 to the top or upper surface of carriage 36 so as to be positioned vertically thereon and equi-distantly spaced about its outer or peripheral edge. If desired a suitable clamping device 39 comprising complemental clamping members 39a and 39b that are mounted on the upper surface of carriage 36 for sliding motion toward and away from each other, is disposed about the base or open end 16 of each mandrel 23 and serve to hold the preform in fixed position with reference to the mandrel. For purposes that will hereinafter be more fully set forth, the clamping surfaces of members 39a and 39b are provided with an annular channel 40.

To provide means for heating the preforms positioned on the mandrels a conventional heating unit or oven 41 having inner and outer walls 42 and 43, respectively, is mounted on table 38 by means of an outstanding flange 43a that is formed at the base or lower end of its outer wall 43. The base or lower edge of the inner wall 42 of oven 41 is spaced slightly from the top surface of carriage 36 to permit its free rotation relative to the oven 41. The oven 41 is arcuate in form and dimensioned to be disposed over the major portion of the outer edge of carriage 36 and the mandrels 23 carried thereby to the end that as the carriage is rotated either manually or by any suitable mechanism, not shown, in a clockwise direction as viewed in Fig. 1, the mandrels and preforms mounted thereon are passed through the oven from its entrance 44 to the exit 45 thereof.

A pair of parallel arcuate channels 46 and 47 are formed in the upper surface of table 38 under oven 41, and are coextensive with the latter to communicate with the interior of mandrels 23 through the vertical passages 48 and 49 formed through carriage 36 while they are passing through oven 41. Channel 46 is connected through suitable conduit means with a source of a heated fluid, such as air, not shown, while channel 47 is suitably connected to a vent or escape outlet. Thus, a heated fluid such as air can be circulated from channel 46 through passage 48 into the interior of mandrel 23 and exhausted therefrom through passage 49 and channel 47 to internally heat the preform on the mandrel while it is being externally heated by the oven 41.

As shown in Figs. 1 and 6, a bank of molds 50, here shown as two, are positioned at the exit end 45 of oven 41 to receive a pair of adjacent mandrels 23 after they leave the oven. More particularly, each mold 50 comprises inner and outer halves 51 and 52 respectively that are mounted for movement toward and away from each other and which are cooled in any conventional manner, not shown. Mold halves 51 and 52 are provided with complemental mold cavities 51a and 52a, respectively, that are designed to form the body of the article; grooved lower portions 51b and 52b, respectively, that cooperate with mandrel 23 to form the neck portion of the article and external threads thereon; and bevel or knife edges 51c and 52c that cooperate to finish the open end of the neck and to trim off excessive material. The mold halves 51 and 52 are mounted on upper guide rods 53 and lower guide rods 54 that pass through suitable aligned openings in the mold halves and are secured at their opposite ends to inner and outer support members 55 and 56, respectively. Inner support member 55 is provided with a bracket 57, which may be integrally formed therewith, that is suitably secured to the inner wall 42 of oven 41 adjacent the exit end 45 thereof. As shown in Fig. 6, the lower end of inner support member 55 is spaced from the top of carriage 36 to provide a clearance for the latter and thus permit the free rotation of the carriage. Outer support member 56 is secured by suitable means, not shown, to the top of table 38 and disposed outwardly of the periphery of the carriage 36.

To provide means for moving the mold halves 51 and 52 toward and away from each other, support member 55 is recessed as at 58 and the recess is threaded at its outer end to receive the threaded open end of a cylinder 59. A piston 60 is slidably mounted within cylinder 59 and is provided with a piston rod 61 that extends through the inner wall 62 of recess 58. The outer end of piston rod 61 is suitably connected to mold half 51. A spring 63 operatively positioned between end wall 62 and piston 60 biases the piston in a direction to retract piston rod 61 into cylinder 59. The closed end 64 of cylinder 59 is provided with a port 65 that is connected through a suitable conduit 66 with a conventional hydraulic system, not shown, whereby a suitable hydraulic fluid is introduced into cylinder 59 behind piston 60. Upon operation of the hydraulic system the fluid is pressurized and acts upon piston 60 to move it against the bias of spring 63 and extend or protract piston rod 61 thereby moving mold half 51 toward mold half 52. Upon the actuation of the hydraulic system to release the pressure on the fluid, spring 63 moves piston 60 to retract piston rod 61 thereby moving mold 51 away from mold half 52.

Mold half 52 is actuated in a similar manner to that of mold half 51 and to that end, support 56 is provided with a recess 67 having a threaded outer end to receive the open end of a cylinder 68 in which is slidably mounted a piston 69. A piston rod 70 carried by piston 69 extends through the inner wall 71 of the recess and is suitably secured at its outer end to mold half 52. A spring 72 operates between end wall 71 and piston 69 to move it in a direction to retract piston rod 70. The closed end 73 of the cylinder is provided with a port 74 that is connected through a conduit 75 with the hydraulic system to which cylinder 59 is connected. Thus, when the hydraulic system is actuated to pressurize the fluid, both mold halves 51 and 52 are moved simultaneously and with equal speed toward each other to close mold 50 about a mandrel 23 and the preform mounted thereon. Upon the release of the pressure on the fluid, their respective springs 62 and 72 simultaneously move the mold halves away from each other to open mold 50.

To provide means whereby a suitable fluid under pressure, such as air, is introduced into the open end of mandrel 23 and is directed through the pressure ports 24 thereof against the preform to force it into intimate contact with mold 50 and thereby form the article; and further, to provide means whereby this forming fluid is circulated through the interior of the article immediately after it is formed to the end that the forming fluid also serves as a heat transfer medium to withdraw heat from the article and thereby cool and set it, passages 48 and 49 are aligned with suitable inlet and outlet ports 76 and 77, respectively, that are formed through table 38, when mandrel 23 is disposed within mold 50. Inlet port 76 communicates by way of a conduit 78 with a source of air under pressure, not shown. A conventional valve 79 mounted in conduit 78 controls the pressure of the fluid delivered through inlet port 76 and passage 48 into the interior of the mandrel 23. Outlet port 77 is connected to a vent conduit 80 and a conventional valve 81 controls the pressure of the fluid vented from the interior of mandrel 23 through passage 49, port 77 and conduit 80. Thus, by suitably adjusting valves 79 and 81 the forming fluid is introduced into mandrel 23 by inlet port 76 and passage 46 at a suitably high pressure. Therefore, the fluid under pressure forces the preform into forming contact with the relatively cold walls of the mold cavities 51a and 52a to form the article. Upon contact with the walls of the mold the article begins to cool and set, at the same time because of the port 77 a circulation of this forming fluid is induced which further serves to cool and set the formed article. Manifestly the pressure of the forming fluid must be such that article will be formed and the fluid circulated through and out of the mold.

Figure 7:
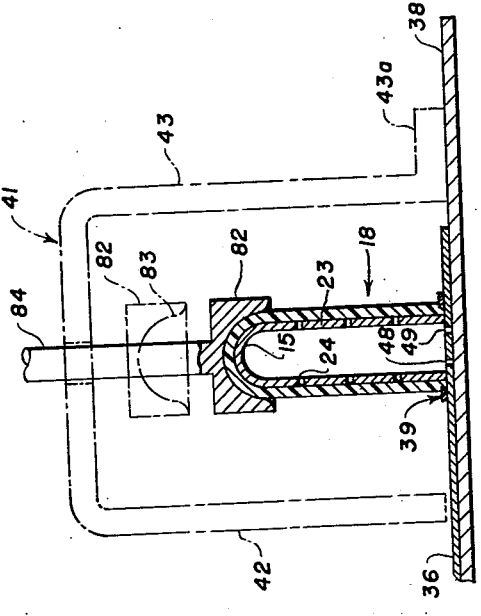
Fig. 7 is a section taken along line 7—7 of Fig. 1 showing the means for closing the open end of a preform.

In instances when the preforms are provided with coextensive axial openings, the end of the preform corresponding to the bottom of the article is closed just prior to the time that the mandrels pass out of the exit end 45 of oven 41. As shown in Fig. 7, a platen 82 having a cup-like forming surface 83 designed to generally agree and cooperate with the rounded end 15 of mandrel 23 to close the open end of the preform, is mounted by a rod 84 to a suitable mechanism, not shown, which serves to move platen 82 from its raised position (phantom lines) to its forming position in which the surface 83 forms or molds the open end of the preform over the rounded end 15 of the mandrel.

Figure 8:
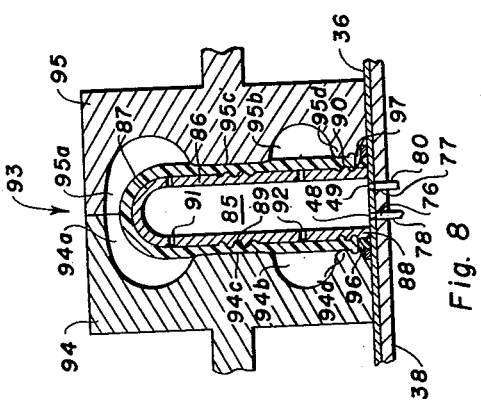
Fig. 8 is a section similar to Fig. 6 but showing a modified form of the mandrel and mold.

In Fig. 8, a modification of the mandrels and molds is shown whereby a bottle or flask having reentrant curved surfaces similar to an hour-glass and having interior threads or any desired embossed design formed at the waist and neck portions thereof may be fabricated. More particularly, this modified mandrel 85 comprises a hollow cylindrical body 86 having a closed end 87 and an open base end 88. Medially of its length and adjacent its base end, the body 86 of mandrel 85 is provided with external threaded portions 89 and 90. The pressure ports 91 and 92 are, in this instance, situated adjacent the opposite ends of the body 86 of the mandrel.

The mold 93 includes complemental inner and outer mold halves 94 and 95 having upper mold cavities 94a and 95a and lower mold cavities 94b and 95b. Intermediate the upper and lower cavities, the mold halves 94 and 95 are provided with inwardly extending portions having forming surfaces 94c and 95c that cooperate with the external threaded portion 89 of the mandrel to produce an internally threaded portion at the waist of the article when mold 93 is closed. At the lower ends thereof, mold halves 94 and 95 are provided with inwardly extending portions having forming surfaces 94d and 95d that cooperate with the external threaded portion 90 of mandrel 85 to produce an internal thread in the neck of the article when the mold 93 is closed. It is clear that the threads above described or any embossed design are created or molded in the preform by the cooperative action between the portions 89 and 90 of the mandrel and the forming surfaces 94c and 95c, and 94d and 95d, respectively, and not by fluid pressure.

As in the instance of mold halves 51 and 52, mold halves 94 and 95 are provided with inwardly extending bevel or knife edges 96 and 97 that finish the outer end of the neck of the article and trim off excess material.

To fabricate flasks or bottles each having a body portion substantially oval in cross-section and an externally threaded cylindrical neck projecting from one end of the body, a series of mandrels 23 are mounted in spaced relationship on carriage 36 as shown in Fig. 1. In the apparatus shown herein, two adjacent mandrels constitute a station. Therefore, to commence the fabrication of the bottles, molds 50 are opened to permit rotation of carriage 36, and a preform 18 is positioned on each of the two mandrels 23 disposed in front of the entrance 44 of the oven 41 and secured thereto, if desired, by clamps 39. The preforms 18 are positioned on mandrels 23 to have the thickened wall portions 21 disposed opposite or in alignment with the ports 24 as shown in Fig. 3A. Carriage 36 is then rotated either manually or by a suitable driving mechanism, not shown, to move the mandrels and preforms into oven 41 to begin the heating of the preforms. As the mandrels move into the oven, ports 48 and 49 come into communication with channels 46 and 47 to the end that the heated fluid or air is circulated from channel 46 through port 48, the interior of the mandrel, port 49 and vent channel 47. This circulation of heated air serves to internally heat the preform 18 mounted on mandrel 23 while it is heated externally by the oven.

Each mandrel 23 is fitted with a preform 18 in the foregoing manner and as the preforms pass through the oven 41 they are heated both externally and internally until they reach a temperature where they are ready for forming. The rotation of carriage 36 is so timed that when the mandrels 23 are positioned beneath platens 82 they are heated to the point where they may be readily manipulated and formed. In the event the preforms 18 are of the type in which the axial opening 20 thereof extends completely through the preform, platen 82 is lowered and the upper open end of the preform is molded or formed over the rounded closed end 15 of mandrel 23 and is thereby closed. On the other hand, if the preforms 18 are of the type having closed ends 35, as shown in Fig. 4, the foregoing step may be eliminated.

As the heated preforms 18 leave the exit 45 of the oven 41 they are ready for molding and are disposed between mold halves 51 and 52. Mold halves 51 and 52 are moved toward each other, as hereinbefore set forth, and as they move into mating engagement, the threaded portions 51b and 52b coact with the adjacent lower part of mandrel 23 and press the preform therebetween to form the neck of the bottle as well as the external threads in the outer surface of the neck. Since the neck of the article is formed on mandrel 23, it is manifest that the diameter of the opening through the neck is determined by the outside diameter of the mandrel 23. Moreover, since the axial opening in the preform is substantially the same as the outside diameter of the mandrel, it is apparent that little or no flash is produced in the forming of the neck of the article. In addition, bevel or knife edges 51c and 52c cut across the lower part of the preform to trim the excess material from the lower edge of the preform and at the same time finish it. During the portion of the fabrication of the preform, the channel 40 in clamp 39 receives any excess material of the preform.

When the mold halves 51 and 52 are in forming engagement, preform 18 is allowed to partially cool and then valve 79 is operated to permit the pressurized fluid to enter from conduit 78, inlet port 76 and passageway 48 into the interior of mandrel 23. The pressurized fluid then passes through ports 24 thereby being directed initially against the thickened portions 21 of preform 18. Therefore, as the preform is expanded outwardly by the pressurized fluid the heated material is drawn first from the thickened portions 21 of the preform with the result that as the preform is forced into forming contact with relatively cold walls of the mold cavities 51a and 52a the walls of the body assume uniform thickness. Upon forming contact with the cool walls of the mold, the article begins to cool and set.

Either simultaneously with the opening of valve 79, or shortly thereafter, valve 81 is operated to open vent conduit 80 and thereby permit the pressurized forming fluid to vent or exhaust from the interior of the body as it is being formed and the interior of mandrel 23. Valve 80 is so adjusted that the rate at which the pressurized forming fluid exhausts through conduit 80 is less than the rate at which it is introduced into the mandrel. Therefore, although the pressurized fluid is at a sufficiently high pressure to form the preform 18 into its ultimate shape a circulation of the pressurized fluid is also achieved to the end that it serves as a heat transfer medium which cools the bottle formed from preform 18.

After the bottle formed from preform 18 has cooled and set, mold halves 51 and 52 are moved away from each other, as hereinbefore set forth, and carriage 36 is rotated to position the finished bottle at the starting station. The finished bottle is then removed from the mandrel 23 and another preform is situated thereon.

It is understood that various changes and modifications of the method and apparatus of the present invention may be made without departing from the spirit and scope hereof.

What is claimed is:

1. In apparatus for fabricating hollow articles from hollow preforms of an organic plastic material, the combination comprising a base, a carriage rotatably mounted on said base, a plurality of hollow mandrels mounted in a vertical position on said carriage adjacent to and spaced about the outer edge thereof, each of said mandrels having a series of ports formed through the side wall thereof, an oven having an open entrance at one end and an open exit at the other end thereof, said oven mounted on said base to be disposed over a part of the outer edge of said carriage whereby upon the rotation of said carriage the mandrels pass sequentially through the oven, means communicating the interior of the mandrels passing through said oven with a source of heated fluid, at least one mold mounted on said base at the exit of said oven and comprising complemental mold halves mounted for movement toward and away from each other between closed and open positions and constructed and arranged to enclose one of said mandrels when in the closed position, means for moving said mold halves toward and away from each other, and means for communicating the interior of a mandrel enclosed within a mold with a source of pressurized fluid.

2. In apparatus for fabricating hollow articles from hollow preforms of organic plastic materials, the combination comprising a base, a carriage rotatably mounted on said base, at least one hollow mandrel having ports formed through the side wall thereof and mounted in a vertical position on said carriage adjacent the outer edge thereof, an oven having an open entrance at one end and an open exit at the other end thereof and mounted on said base to be disposed over a part of the outer edge of said carriage whereby upon the rotation of said carriage the mandrel passes through the oven from the entrance to the exit thereof, at least one mold mounted on said base at the exit of said oven and comprising complemental mold halves mounted for movement toward and away from each other between closed and open positions and constructed and arranged to enclose a mandrel when in the closed position, means for moving said mold halves toward and away from each other and means for communicating the interior of a mandrel enclosed within a mold with a source of pressurized fluid.

3. In apparatus for fabricating a hollow bottle having neck and body portions from a preform of organic plastic material that becomes moldable when heated, said preform having an axial opening therein the diameter of which is substantially equal to the diameter of the opening through the neck portion of the bottle to be formed and walls of predetermined thickness relative to the axial opening as determined by the cross-section of the body portion of the bottle to be formed, the combination comprising a hollow cylindrical mandrel having a diameter substantially equal to the axial opening in the preform and on which the preform is positioned to internally support it, said mandrel having a plurality of ports formed through its side wall arranged to be disposed adjacent the thickened wall portions of the preform, means for heating the preform while it is positioned on said mandrel, mold means including complemental mold halves mounted for movement toward and away from each other between closed and opened positions and having complemental portions to form the neck and body portions of the bottle to be formed and means for moving said mold halves between the closed and opened positions thereof, the neck forming portions of said mold halves cooperating with said mandrel to form the neck portion of the bottle as the mold halves move into the closed position thereof, means for introducing a pressurized fluid into the interior of said mandrel whereby the pressurized fluid passes through the ports in said mandrel to expand the preform into forming contact with the body forming portions of the mold halves to thereby form the body portion of the bottle, and means for circulating the pressurized fluid within the interior of the mandrel and formed body portion of the bottle to cool and set the bottle thus formed.

4. In apparatus for fabricating a hollow bottle having neck and body portions from a preform of organic plastic material that becomes moldable when heated, said preform having an axial opening therein the diameter of which is substantially equal to the diameter of the opening through the neck portion of the bottle and walls of predetermined thickness relative to the axial opening as determined by the cross-section of the body portion of the bottle, the combination comprising a hollow cylindrical mandrel having a diameter substantially equal to the axial opening in the preform and on which the preform is positioned to internally support it, said mandrel having a plurality of parts formed through its side wall arranged to be disposed adjacent the thickened wall portions of the preform and threaded portions formed on the exterior thereof, means for heating the preform while it is positioned on said mandrel, mold means constructed and arranged to enclose a mandrel having a heated preform supported thereon and including complemental mold halves mounted for movement toward and away from each other between closed and opened positions, said mold halves having complemental portions to cooperate with the mandrel to form the neck and threaded portions on the bottle and complemental portions to form the body portion of the bottle, means for moving said mold halves between the closed and opened positions thereof, the complemental neck and thread forming portions of said mold halves cooperating with said mandrel to form the neck and threaded portions of the bottle as the mold halves move into the closed position thereof, means for introducing a pressurized fluid into the interior of said mandrel whereby the pressurized fluid passes through the ports in said mandrel to expand the preform into forming contact with the complemental body forming portions of the mold halves to thereby form the body portions of the bottle, and means for circulating the pressurized fluid within the interior of the mandrel and formed body portion of the bottle to cool and set the same.

References Cited in the file of this patent

UNITED STATES PATENTS

| | | |
|---|---|---|
| 2,169,315 | Yngve | Aug. 15, 1939 |
| 2,262,612 | Kopitke | Nov. 11, 1941 |
| 2,315,478 | Parkhurst | Mar. 30, 1943 |
| 2,348,738 | Hofmann | May 16, 1944 |
| 2,405,245 | Ushakoff | Aug. 6, 1946 |
| 2,410,936 | Gronemeyer et al. | Nov. 12, 1946 |
| 2,632,202 | Haines | Mar. 24, 1953 |
| 2,657,431 | Slaughter | Nov. 3, 1953 |

FOREIGN PATENTS

| | | |
|---|---|---|
| 505,994 | Belgium | Oct. 15, 1951 |
| 684,611 | Great Britain | Dec. 24, 1952 |

OTHER REFERENCES

"Blow-moulding of polythene bottles" in British Plastics, vol. 26, No. 293 (October 1953), pp. 357–360, published by Iliffe & Sons, Ltd., London, England.

Bailey: "Blow Molding Opens Opportunities to Plastics" in Plastics, vol. 2, No. 4 (April 1945), pp. 70, 72, 74, 75, 118, 119, and 120, published by Ziff-Davis Publishing Co., Chicago, Ill.